United States Patent Office 3,766,148
Patented Oct. 16, 1973

3,766,148
POLYURETHANE ELASTOMERS PREPARED FROM 4,4 - METHYLENE-BIS(CYCLOHEXYL ISOCYANATE), POLYOL AND METHYLENE DIANILINE
Bernard Taub, Williamsville, N.Y., assignor to Allied Chemical Corporation, New York, N.Y.
No Drawing. Continuation-in-part of abandoned application Ser. No. 794,763, Jan. 28, 1969. This application May 17, 1971, Ser. No. 144,210
Int. Cl. C08g 22/24
U.S. Cl. 260—77.5 AM                14 Claims

ABSTRACT OF THE DISCLOSURE

Polyurethane elastomers of improved hydrolytic stability are obtained from 4,4′-methylene-bis(cyclohexylisocyanate), a polyol and methylene dianiline.

Cross-reference to related application

This application is a continuation-in-part of my copending U.S. application Ser. No. 794,763, now abandoned, entitled "Polyurethane Elastomers Prepared from 4,4′-Methylene-Bis-(Cyclohexyl Isocyanate), Polyol and Methylene Dianiline," filed Jan. 28, 1969.

Background of the invention

It is known that polyurethane compositions can be prepared by chain-extending isocyanate-terminated prepolymers with a curing agent containing active hydrogens, such as a diamine, polyol, water and the like. The prepolymers are commonly prepared by condensation of a polyester or polyether with an excess of an aromatic diisocyanate. Where high performance elastomers are desired the preferred curing agents are aromatic diamines. However, the use of aromatic diamines presents a processing problem with many prepolymers. For example, when an isocyanate-terminated prepolymer is reacted with a highly reactive aromatic diamine such as methylene dianiline, the reaction is so rapid that there is not ample time to run the mixture into a suitable mold before the composition begins to gel. In most instances, the mixture of the prepolymer and diamine chain-extender remain in a fluid, pourable condition for a relatively short time, that is, such compositions gel in a relatively short period of time, generally measurable in seconds. This necessitates the preparation of such mixtures in small batches which is inconvenient and expensive since it is time consuming and is not conducive to large scale manufacture. Various procedures have been suggested to overcome the problem, but with little success. One proposed procedure involves the use of an aromatic diamine at a temperature below its melting point, as a finely-divided solid. However, the use of this technique presents problems with regard to mixing since, in general, a homogeneous mixture is more difficult to achieve with a solid-liquid system than with a liquid-liquid system.

The problem of rapid reactivity has therefore discouraged the use of many aromatic diamines. An exception is found in the case of certain halogenated aromatic diamines such as methylenebis(o-chloroaniline) and 3,3′-dichlorobenzidine. In such compounds the presence of chlorine groups ortho to the amine group, tends to slow down the curing reaction sufficiently to make the process workable.

There are, however, several disadvantages to the use of the chlorine-containing diamines. They often slow down the curing reaction to such an extent that the reaction becomes unreasonably slow for some purposes necessitating the use of catalysts to accelerate the reaction to a practical degree. Moreover, such clorine-containing diamines are relatively expensive compared to methylene dianiline and result in elastomers having poor hydrolytic stability.

It is an object of the present invention to provide liquid polyurethane prepolymer-curing agent compositions having improved curing times wherein the curing agent is methylene dianiline. It is a further object to provide polyurethane elastomers having improved hydrolytic stability.

Summary of the invention

It has now been found that 4,4′-methylene dianiline (hereinafter referred to simply as methylene dianiline) can be effectively used as a curing agent with isocyanate-terminated prepolymers prepared from 4,4′-methylene-bis (cyclohexyl isocyanate) and a polyol. In contrast to prior art prepolymer-methylene dianiline compositions, the compositions of the present invention provide a substantially improved curing time e.g. the gel time is sufficiently long to permit use of the composition in the desired way but is not so long as to necessitate the use of catalysts to accelerate the curing reaction, and can be readily cast or molded to produce elastomeric products of the desired shape. Furthermore it has been found the elastomers thus prepared exhibit a considerably higher degree of hydrolytic stability than elastomers prepared from compositions cured with halogen-containing diamines such as methylene-bis(o-chloroaniline).

Various other aromatic diamines such as 2,4-toluene diamine and m-phenylene diamine, when used as curing agents with 4,4′ - methylene-bis(cyclohexyl isocyanate) based prepolymers, may exhibit some improvement in gel time. In general, however the improvement in gel time is less satisfactory than in the case of methylene dianiline and is not accompanied by as great an improvement in hydrolytic stability.

Detailed description of the invention and preferred embodiment thereof

The prepolymer compositions useful in the present invention are prepared in a conventional manner by condensation of an excess of 4,4′-methylene-bis(cyclohexyl isocyanate) with a polyol to form an isocyanate-terminated prepolymer which is then reacted with methylene dianiline. The polyol is reacted with 4,4′-methylene-bis (cyclohexyl isocyanate) in proportions suitable to yield a prepolymer having an NCO/OH ratio greater than 1 and preferably between about 1.4 and 3.0. In a preferred embodiment, the mixture of polyol and isocyanate are heated at about 80 to 140° C. for about 3 hours after which the chain extender is added thereto. The polyol component used to prepare the prepolymer can be either a polyester polyol or polyether polyol having a molecular weight of between about 350 and 5000. Such compounds are well known in this art and are prepared in the conventional manner. For example, the polyester polyols are prepared by condensation of one or a mixture of dibasic acids, esters or acid halides and one or a mixture of glycols. Representative examples of the dibasic acids which may be used include adipic, methyl adipic, malonic, maleic, succinic, suberic, sebacic, phthalic, isophthalic, terephthalic and the like. The glycol component is typified by ethylene glycol, diethylene glycol, tetramethylene glycol, propylene glycol, 1,3-propane diol, 1,6-hexane diol and the like. Polyesters derived from adipic acid and a mixture of ethylene and propylene glycol are preferred.

Typical polyether polyols include, for example, polyoxyethylene glycol, polyoxypropylene glycol, polytetramethylene ether glycol and the like which are typical of polyalkylene ether glycols which are believed to have the general formula

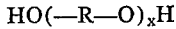

$$HO(-R-O)_xH$$

wherein R is a straight or branched-chain saturated alkylene radical of 2 to 4 carbon atoms and $x$ is an integer of such magnitude that the molecular weight of the glycol is within the range of 350 and 5000.

Methylene-bis(4-cyclohexyl isocyanate) exists in 3 different isomeric forms depending on the position (i.e. cis or trans, of the isocyanate group with respect to the methylene bridging group. The usual commercial grades of the isocyanates are mixtures of various proportions of the 3 geometric isomers, i.e. the cis-cis, cis-trans, and trans-trans isomers. The isomers can be separated by conventional physical separation methods. The 4,4'-methylene-bis (cyclohexyl isocyanate) reactants employed in the present invention which include both pure isomers and mixtures of the isomers of 4,4'-methylene-bis-(cyclohexyl isocyanate) can be characterized by the designation of the weight ratio of total trans moieties, that is trans groups, to the total cis moieties of the reactant. Thus, for example a 4,4'methylene-bis(cyclohexyl isocyanate) containing 41 weight percent trans-trans isomer, 50 weight percent cis-trans isomer and 9 percent cis-cis isomer can be characterized as containing $41+\frac{1}{2}(50)=66$ weight percent trans moieties and $9+\frac{1}{2}(50)=34$ weight percent cis moieties, which concentrations correspond to a weight ratio of total trans to total cis moieties of 66.34.

In the practice of the invention I prefer to employ a 4,4'methylene-bis(cyclohexyl isocyanate) reactant having a weight ratio of total trans moieties to total cis moieties greater than about 65:35, still preferably a 4,4'-methylene-bis(cyclohexyl isocyanate) isomer mixture having a weight ratio of total trans to total cis moieties between about 70:30 and about 90:10. The preferred isocyanate reactants of the invention provide methylene dianiline-extended polyurethane products of surprising long term hydrolytic stability with especial regard to retention of tensile strength and hardness as compared to the corresponding methylene dianiline-extended polyurethanes of the invention which are prepared from 4,4'-methylene-bis (cyclohexyl isocyanate) reactants having a lower concentration of trans moieties as is illustrated by a comparison of the results of Examples 8–10 with those of Example 7 below. An especially good result is achieved according to the invention in employing as the isocyanate reactant, the aforementioned 4,4'-methylene-bis(cyclohexyl isocyanate) reactant having a weight ratio of total trans to total cis moieties greater than about 65:35 and, as the polyol reactant, a polyalkylene ether glycol.

The amount of methylene dianiline employed should be sufficient to react with between about 75 and 100% of the free isocyanate groups in the prepolymer, e.g. the $NH_2/NCO$ is within the range of about 0.75 to 1.0 and 1.0 to 1.0 preferably is 0.9 to 1.0. The reaction of the prepolymer and methylene dianiline is carried out at a temperature above the melting point of methylene dianiline, that is, 65° C. in order that the reactants can be readily mixed as liquids. Preferably the reaction is carried out with mixing at a temperature between about 65 and 135° C. since at these temperatures the optimum gel time is achieved. The term "gel time" as employed herein is defined as the period after which the reaction mixture is no longer pourable at reaction temperature.

The mixture is then poured into a suitable mold, preferably preheated, and maintained at a temperature of between about 65 and 135° C. to effect the gelling of the molded elastomer. In general, the molded elastomer may be removed from the mold after about ½ to 1 hour. The molded product may then be post-cured in a conventional manner, for example, by maintaining it at a temperature of about 100° C. for 15 to 20 hours.

To further illustrate the present invention and the manner in which it may be practiced, the following specific examples are set forth. In the following examples, unless otherwise indicated, all parts, percentages and proportions are by weight and all temperatures are in Centigrade degrees.

EXAMPLE 1

A mixture of 1000 parts of polytetramethylene ether glycol (MW=1000) and 567 parts of methylene-bis(4-cyclohexylisocyanate) (52 percent trans-trans isomer, 42 percent cis-trans isomer, and 6 percent cis-cis isomer corresponding to a total trans moiety:total cis moiety ratio of 73:27) was heated at 130° for 3 hours, then cooled to room temperature. The resulting urethane prepolymer had an NCO content of 5.7%.

100 parts of the prepolymer was heated and mixed at 100° with 13.3 parts of methylene dianiline (sufficient to react with 99% of the available NCO groups). The heated mixture was immediately poured into a mold which had been preheated to 100°. The gel time, that is the time for mixing until the mixture became unpourable, was approximately four minutes.

EXAMPLES 2–3; COMPARATIVE EXAMPLES a–f

In Examples 2–3 and comparative examples on a–f, various other prepolymers were similarly prepared using different isocyanates and the prepolymers were extended as in Example 1 using methylene dianiline in an amount sufficient to react with 99% of the available NCO groups. Prepolymer composition and gel time data of these examples are compared in Table I below with the corresponding data of Example 1.

TABLE I

| | Example | | | Comparative example | | | | | |
|---|---|---|---|---|---|---|---|---|---|
| | 1 | 2 | 3 | a | b | c | d | e | f |
| Components (parts by weight): | | | | | | | | | |
| Polytetramethylene ether glycol (MW=1,000) | 1,000 | 1,000 | 1,000 | 1,000 | 1,000 | 1,000 | 1,000 | 1,000 | 1,000 |
| Methylenebis(4-cyclohexylisocyanate) (52 percent trans-trans, 42 percent cis-trans and 6 percent cis-cis) | 567 | | | | | | | | |
| Methylenebis(4-cyclohexylisocyanate) (24 percent trans-trans, 64 percent cis-trans and 12 percent cis-cis) | | 524 | | | | | | | |
| Methylenebis(4-cyclohexylisocyanate) (94 percent trans-trans, 5 percent cis-trans, and 1 percent cis-cis) | | | 524 | | | | | | |
| 2,4-tolylene diisocyanate | | | | 348 | | | | | |
| Methylenebis(4-phenylisocyanate) | | | | | 536 | | | | |
| 1,6-hexamethylene diisocyanate | | | | | | 332 | | | |
| 2-carbomethoxy 1,5-pentamethylene diisocyanate | | | | | | | 420 | | |
| (2-isocyanatoethyl)-6-isocyanatohexanoate | | | | | | | | 467 | |
| Xylylene diisocyanate | | | | | | | | | 382 |
| Methylene dianiline (parts per 100 parts of prepolymer) | 13.3 | 12.4 | 12.4 | 13.1 | 13.1 | 13.2 | 13.2 | 12.7 | 13.5 |
| Gel time (minutes) | 4 | 8 | 2 | ½ | ½ | ½ | ½ | ½ | ½ |

EXAMPLE 4

A mixture of 1000 parts of polytetramethylene ether glycol and 567 parts of the 4,4'-methylene-bis(cyclohexyl isocyanate) reactant of Example 1 was heated at 120° for two hours. The resulting prepolymer had an isocyanate content of 5.7 percent.

A portion of the prepolymer was extended by reaction at 100 degrees with methylene dianiline in an amount sufficient to react with 90 percent of the available NCO groups and the elastomer was cast in sheet form.

A second portion of the prepolymer was similarly extended and cast at 100° degrees at the 90% level with methylene-bis(o-chloroaniline) ("MOCA") with 0.1 percent (based on the amount of prepolymer plus MOCA) of phenyl mercuric benzoate being added to catalyze the elastomer formation. The addition of phenyl mercuric benzoate was necessary since without it the elastomer formation was found to be impractically slow.

Samples of each elastomer were post-cured at 100 degrees for 18 hours and then conditioned in an atmosphere of 50 percent relative humidity for 10 days at 25 degrees, and then immersed in water at 98°. Samples were removed from the water periodically and tested for tensile properties. The results, which indicate the hydrolytic stability of the samples, are summarized in Table II, below:

TABLE II

| Composition and properties | Example 4 | Comparative Example 4a |
|---|---|---|
| Prepolymer (parts): | | |
| Polytetramethylene ether glycol | 1,000 | 1,000 |
| 4,4'-methylene-bis(cyclohexyl isocyanate) | 567 | 567 |
| NCO content (percent) | 5.7 | 5.7 |
| Curing agent (parts per 100 parts of prepolymer): | | |
| Methylene dianiline | 12.1 | |
| Methylene-bis(o-chloroaniline) | | 16.3 |
| Gel time (minutes) | 5 | 11 |
| Tensile strength (p.s.i.): | | |
| Initial | 5,200 | 5,000 |
| After— | | |
| 1 day | 4,900 | 5,200 |
| 2 days | 4,900 | 5,000 |
| 3 days | 5,200 | 5,100 |
| 7 days | 5,600 | 5,100 |
| 14 days | 5,000 | 2,800 |
| Percent strength retention after 14 days | 96 | 56 |

EXAMPLE 5

A polyurethane prepolymer, having an NCO content of 5.8 percent, was prepared by mixing and reacting 1000 parts of polyoxypropylene glycol (MW=1000), and 567 parts of the 4,4'-methylene-bis(cyclohexyl isocyanate) reactant of Example 1 at 130 degrees for 3 hours.

A portion of the prepolymer (100 parts) was extended by reaction, at 100° with methylene dianiline in an amount sufficient to reaction with 90 percent of the available NCO groups and the resulting elastomer was cast in sheet form.

A second portion of the prepolymer was similarly extended and cast at 100 degrees at the 90% level with methylene-bis(o-chloroaniline) with 0.1 percent, based on the amount of prepolymer plus MOCA, of phenyl mercuric benzoate being added to aid the elastomer formation.

Samples of each elastomer were post cured at 100° for 18 hours and then conditioned in an atmosphere of 50 percent relative humidity for 10 days at 25 degrees and then immersed in water at 98°. Samples were removed from the water at various intervals and tested for tensile properties. The results, which indicate the hydrolytic stability of the samples are summarized in Table III, below.

TABLE III

| Composition and properties | Example 5 | Comparative Example 5a |
|---|---|---|
| Prepolymer (parts): | | |
| Polyoxypropylene glycol | 1,000 | 1,000 |
| 4,4'-methylene-bis(cyclohexyl isocyanate) | 567 | 567 |
| NCO content | 5.85 | 5.85 |
| Curing agent (parts per 100 parts of prepolymer): | | |
| Methylene dianiline | 12.4 | |
| Methylene-bis(o-chloroaniline) | | 16.4 |
| Gel time (minutes) | 5 | 13 |
| Tensile strength (p.s.i.): | | |
| Initial | 4,000 | 3,800 |
| After— | | |
| 1 day | 4,100 | 3,800 |
| 2 days | 4,200 | 3,900 |
| 3 days | 4,100 | 3,900 |
| 7 days | 4,200 | 3,400 |
| 14 days | 2,800 | 1,400 |
| Percent strength retention after 14 days | 70 | 37 |

EXAMPLE 6

A polyurethane prepolymer, having an NCO content of 5.77%, was prepared by mixing and reacting 1000 parts of poly(ethylenepropylene adipate) (MW=2000) with 405 parts of the 4,4'-methylene-bis(cyclohexyl isocyanate) reactant of Example 1 at 120° for 2 hours.

Separate portions of the prepolymer were extended at the 90% level, as in Example 5, with methylene dianiline and with methylene-bis(o-chloroaniline). The latter required the addition of 0.1%, based on the weight of methylene-bis(o-chloroaniline of phenylmercuric benzoate to catalyze the reaction.

Samples of each were prepared and tested for hydrolytic stability as in Example 5. The results obtained are tabulated below:

TABLE IV

| Composition and properties | Example 6 | Comparative Example 6a |
|---|---|---|
| Prepolymer (parts): | | |
| Poly(ethylenepropylene adipate) | 1,000 | 1,000 |
| 4,4'-methylene-bis(cyclohexyl isocyanate) | 405 | 405 |
| NCO content (percent) | 5.77 | 5.77 |
| Curing agent (parts per 100 parts of prepolymer: | | |
| Methylene dianiline | 12.4 | |
| Methylene-bis(o-chloroaniline) | | 16.6 |
| Gel time (minutes) | 3 | 3 |
| Tensile strength (p.s.i.): | | |
| Initial | 5,400 | 4,900 |
| After— | | |
| 1 day | 5,500 | 4,600 |
| 2 days | 5,200 | 3,900 |
| 3 days | 4,100 | 2,700 |
| 7 days | 700 | (1) |
| Strength retention after 3 days (percent) | 76 | 55 |
| Strength retention after 7 days (percent) | 13 | 0 |

[1] Unmeasurable.

The following Examples 7–10 illustrate the hydrolytic stability of polyurethanes of the invention which are prepared from 4,4'-methylene-bis(cyclohexyl isocyanate) of different weight ratios of trans, cis moieties.

EXAMPLES 7–10

In each of Examples 7–10, 500 parts (1.0 equivalent) of the polytetramethylene ether glycol of Example 1 was heated for 3 hours at 30° with 262 parts (2.0 equivalents) of 4,4'-methylene-bis(cyclohexyl isocyanate) to form an isocyanate-terminated prepolymer, the isomer distribution in the 4,4'-methylene-bis(cyclohexyl isocyanate) reactant being different in each experiment. Each of the resultant prepolymers after being cooled to room temperature and analyzed for percent free NCO groups was extended with an amount of methylene dianiline sufficient to react with 99% of the NCO groups of the prepolymer, substantially in accord with the procedure of Example 1. Each of the resultant polyurethane elastomer samples was post cured at 100° for 20 hours, conditioned in an atmosphere of 50% relative humidity for 10 days at 25°, then immersed in water at 95°. The samples were removed from the water periodically and tested for tensile strength and hardness. The results of these experiments are summarized in Table V below:

TABLE V

| Example | 7 | 8 | 9 | 10 |
|---|---|---|---|---|
| Prepolymer (components and properties): | | | | |
| 4,4'-methylene-bis(cyclohexyl isocyanate): | | | | |
| As in Example 2 (corresponding to a total trans: total cis moieties ratio of 56:44), parts | 262 | | | |
| 41 percent trans-trans, 50 percent cis-trans, 9 percent cis-cis (corresponding to a total trans:total cis moieties ratio of 66:34), parts | | 262 | | |
| 59 percent trans-trans, 34.5 percent cis-trans, 6.5 percent cis-cis (corresponding to a total trans:total cis moieties ratio of 76:24), parts | | | 262 | |
| 79.5 percent trans-trans, 17.0 percent cis-trans, 3.5 percent cis-cis (corresponding to a total trans:total cis moieties ratio of 18:12), parts | | | | 262 |
| Polytetramethylene ether glycol (MW=1,000), parts | 500 | 500 | 500 | 500 |
| Analysis of preoplymer: NCO content, percent | 5.32 | 5.40 | 5.42 | 5.32 |
| Polyurethane elastomer (properties): | | | | |
| Gel time (minutes) | 8 | 5 | 5 | 3 |
| Tensile strength, p.s.i.: | | | | |
| Initial | 6,670 | 7,180 | 7,420 | 7,880 |
| After— | | | | |
| 1 week immersion | 5,790 | 5,750 | 6,120 | 5,900 |
| 2 weeks immersion | 5,290 | 5,260 | 6,510 | 5,660 |
| 4 weeks immersion | 4,440 | 4,030 | 5,570 | 5,430 |
| 6 weeks immersion | 2,220 | 4,050 | 4,580 | 4,510 |
| Hardness, Shore D Durometer units: | | | | |
| Initial | 53 | 53 | 54 | 54 |
| After— | | | | |
| 1 week immersion | 53 | 50 | 52 | 53 |
| 2 weeks immersion | 48 | 48 | 55 | 48 |
| 4 weeks immersion | 46 | 50 | 52 | 52 |
| 6 weeks immersion | 36 | 50 | 50 | 50 |
| Percent retention of tensile strength after 6 weeks immersion in water at 95° | 33 | 57 | 62 | 57 |
| Percent retention of hardness after 6 weeks immersion in water at 95° | 68 | 94 | 93 | 94 |

The data of Table V above demonstrate that methylene dianiline-extended polyurethanes of the invention which are prepared from a 4,4'-methylene-bis(cyclohexyl isocyanate) reactant having a total trans:total cis moieties ratio greater than about 65:35, as in Examples 8–10, are of surprisingly greater hydrolytic stability that the comparable polyurethanes prepared from a 4,4'-methylene-bis (cyclohexyl isocyanate) reactant of lower total trans:cis moieties ratio, as in Example 7.

I claim:

1. A polyurethane elastomer which is the reaction product of an isocyanato-terminated prepolymer with methylene dianiline, said prepolymer being the reaction product of an excess of 4,4'-methylene-bis(cyclohexylisocyanate) wherein the weight ratio of total trans to total cis moieties is greater than 65:35, and a polyol having a molecular weight of between about 350 and 5000.

2. A polyurethane elastomer as claimed in claim 1 wherein said polyol is a polyalkylene ether polyol.

3. A polyurethane elastomer as claimed in claim 1 wherein said polyol is a polyester polyol.

4. A polyurethane elastomer as claimed in claim 1 wherein said methylene dianiline is provided in an amount sufficient to react with between about 75 and 100 percent of the NCO groups of the prepolymer.

5. A polyurethane elastomer as claimed in claim 1 wherein the NCO/OH ratio of said prepolymer is between about 1.4 and 3.0 to 1.0.

6. A polyurethane elastomer as claimed in claim 2 wherein said polyalkylene ether polyol is polytetramethylene ether glycol having a molecular weight of about 1000.

7. A polyurethane elastomer as claimed in claim 2 wherein said polyalkylene ether polyol is a polyoxypropylene glycol having a molecular weight of about 1000.

8. A polyurethane elastomer as claimed in claim 3 wherein said polyester polyol is a polyethylene propylene adipate having a molecular weight of about 2000.

9. A process for the preparation of a polyurethane elastomer which comprises reacting an isocyanato-terminated prepolymer with methylene dianiline, said prepolymer being the reaction product of 4,4'-methylene-bis(cyclohexylisocyanate) wherein the weight ratio of total trans to total cis moieties is greater than 65:35, and a polyol having a molecular weight of between about 350 and 5000.

10. A process as claimed in claim 9 wherein methylene dianiline is provided in an amount sufficient to react with between about 75 and 100 percent of the NCO groups of the prepolymer.

11. A polyurethane elastomer as claimed in claim 1 wherein the 4,4'-methylene-bis(cyclohexyl isocyanate) reactant has a weight ratio of total trans to total cis moieties between about 70:30 and 90:10.

12. A polyurethane elastomer as claimed in claim 2 wherein the methylene dianiline is provided in an amount sufficient to react with between about 75 and 100 percent of the NCO groups of the prepolymer and the NCO/OH ratio of said prepolymer is betwen about 1.4 and 3.0 to 1.0.

13. A polyurethane elastomer as claimed in claim 12 wherein the polyalkylene ether polyol is a polytetramethylene ether glycol.

14. A polyurethane elastomer as claimed in claim 12 wherein the polyalkylene ether polyol is a polyoxypropylene ether glycol.

References Cited

UNITED STATES PATENTS

| | | | |
|---|---|---|---|
| 3,554,962 | 1/1971 | Fischer | 260—45.8 |
| 3,456,037 | 7/1969 | Hoeschle | 260—858 |
| 2,871,226 | 1/1959 | McShane | 260—77.5 AM |
| 2,929,800 | 3/1960 | Hill | 260—77.5 AM |
| 3,188,302 | 6/1965 | Loreny | 260—77.5 AM |
| 3,190,766 | 6/1965 | Yuan | 117—135.5 |
| 3,620,905 | 11/1971 | Abramjan | 260—77.5 AM |

OTHER REFERENCES

Saunders et al., Polyurethanes, Part II, Interscience, New York, 1964, pp. 299–308, 319, 320 and 339.

DONALD C. CZAJA, Primary Examiner

M. J. WELSH, Assistant Examiner

U.S. Cl. X.R.

260—75 NH, 77.5 AT